June 5, 1951  D. C. BAILEY  2,555,952
GLASS RUN CHANNEL
Filed May 24, 1949
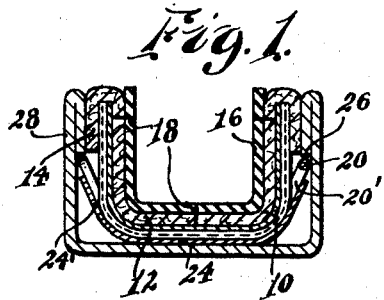
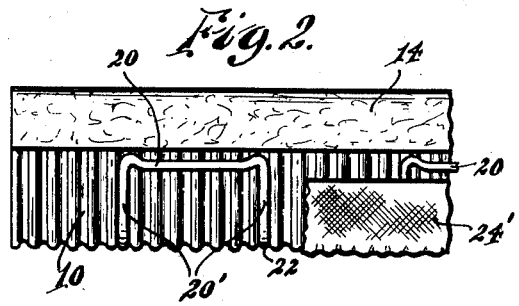
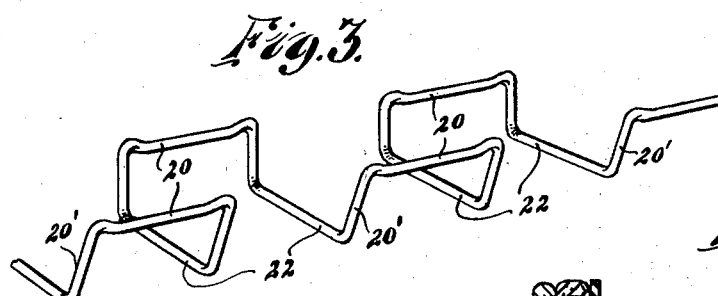
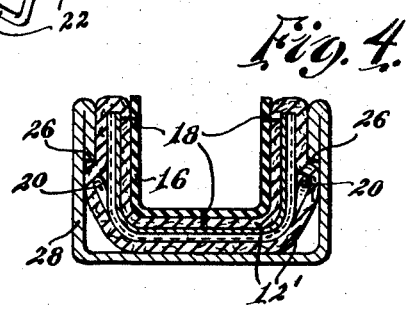
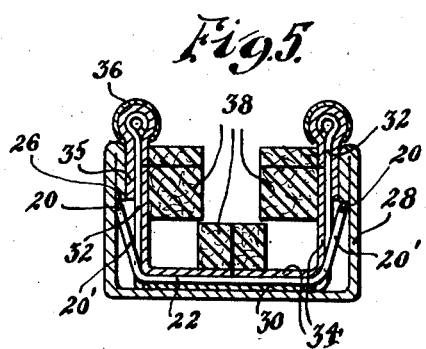
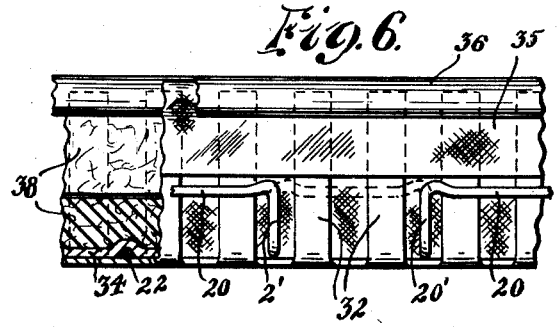
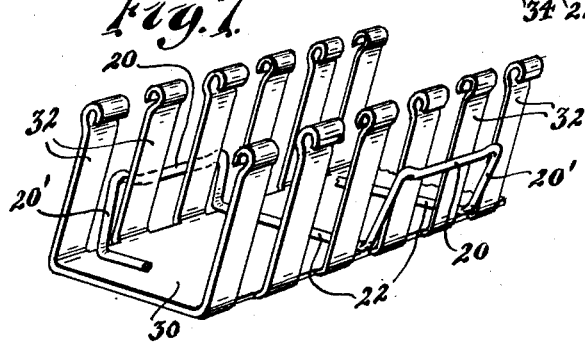
INVENTOR.
David C. Bailey
BY his Atty.,
John H. McKenna Patented June 5, 1951

2,555,952

UNITED STATES PATENT OFFICE 2,555,952

GLASS RUN CHANNEL

David C. Bailey, Amesbury, Mass., assignor to The Bailey Company, Incorporated, Amesbury, Mass., a corporation of Massachusetts Application May 24, 1949, Serial No. 94,968

5 Claims. (Cl. 296—44.5)

This invention relates to improvements in glass run channels of the general type suitable for guiding and cushioning the window glass in vehicles and the like. More particularly it provides improvements in such channels whereby they may be more readily and effectively mounted and supported in operative relation to the window glass.

Glass run channels of the mentioned variety ordinarily have sheet metal constituting the body or core of the channel, with fabric or other comparable material covering the metal, or portions thereof, and with resilient cushioning material interiorly of the channel for engaging the edge and the opposite margins of a window glass. The glass run channels are required to be flexible so that they may be shaped to nicely conform to the curvatures of window frames, and means must be provided for supporting and maintaining the shaped channel in operative relation to the window glass.

It is among the objects of my present invention to provide glass run channels having means thereon for more readily and effectively mounting and maintaining the channels in operative relation to the window glass, as compared with prior proposals and prior procedures.

Another object is to provide glass run channels for vehicle windows and the like having resilient retainer means for coaction with a support for locking the channels to their supports in response to mere pressure of the channels into operative relation to the window glass.

A further object is to provide a flexible glass run channel having flexible retainer means embodied therein for resilient locking coaction with a support for the channel.

It is, moreover, my purpose and object generally to improve the structure of glass run channels and especially the means whereby the channels are mounted and maintained in operative relation to vehicle window glass.

In the accompanying drawing:

Fig. 1 is a cross-sectional view of a mounted glass run channel embodying features of the invention;

Fig. 2 is a side elevation of a section of the glass run channel of Fig. 1, omitting the mounting support of Fig. 1, and with a portion of the retainer cover removed;

Fig. 3 is a perspective view of a section of the channel retainer of Figs. 1 and 2;

Fig. 4 is a view similar to Fig. 1 but showing a modified form of glass run channel having the retainer completely enclosed within the covering for the metal channel body or core;

Fig. 5 is a view similar to Fig. 1 but showing another modified form of glass run channel with the transverse portions of the retainer within the channel and with the retainer portions thereof projecting exteriorly through deep side notches in the metal channel body or core;

Fig. 6 is a side elevation of a section of the glass run channel of Fig. 5, omitting the mounting support of Fig. 5, and with a fragment of one side wall broken away; and Fig. 7 is a perspective view of the metal channel body or core of the glass run channel of Figs. 5 and 6, with the retainer in operative relation thereon.

Referring to the drawing, Figs. 1 and 2 illustrate a glass run channel which has a corrugated metal core channel 10 of a type disclosed and claimed in my United States Patent No. 2,102,936, granted December 21, 1937. The interior of channel 10 is covered by the sheet material 12 which may be a heavy and durable cotton fabric cemented to the metal core. As herein represented, the sheet material extends outward over the side edges of the metal core and downward a substantial distance exteriorly thereof at each side wall of the channel as at 14, these portions 14 being cemented to the metal core in the same manner as the interior portions of the covering sheet 12. A lining of felt or the like 16 is stitched as at 18 to the covering sheet 12 and constitutes the cushioning element for direct engagement with the glass of a window, not shown.

According to the invention, resilient retainers 20 project obliquely from the channel at each side thereof, and spaced apart along each side exteriorly of the channel core 10, each retainer 20 having transverse portions 22 for seating exteriorly in grooves of the corrugated bottom wall of the channel core, with a fabric strip 24 cemented to the said bottom wall over the portions 22 for maintaining the retainers operatively associated with the glass run channel.

Conveniently, although not necessarily, all of the retainers 20 may be integrally formed from a single piece of suitably resilient wire, as best seen in Fig. 3, wherein it may be seen that each transverse portion 22 extends between a retainer 20 at one side to a retainer 20 at the other side, with the retainers in staggered relation at the opposite sides of the channel. The fabric securing strip 24 has a strong cement adhesion to the metal of the bottom wall of the core channel to effect a durable attachment of the retainers 20 to the core channel with the retainers in their inclined operative relations as best seen in Fig. 1 wherein they are shown engaged back of the inturned marginal edges 26 of a supporting channel 28 which will be a rigid part of the window frame, extending all around any particular window. The securing strip 24 preferably extends outward in cemented covering relation to the legs 20' of each retainer, as at 24'.

When the glass run channel of Figs. 1 and 2 is to be mounted, it needs to be merely pressed into the mounting channel 28 until the retainers 20 snap behind the inturned edges 26 of the mounting channel. The retainers resiliently yield toward the core channel as the glass run channel is being pressed into the mounting channel, ultimately snapping outwardly to securely lock the glass run channel in its mounted operative relation to the window glass.

A feature is that the retaining means does not materially interfere with the bending and shaping of a glass run channel to accommodate particular window contours.

Fig. 4 shows a mounted glass run channel generally similar to the Figs. 1 and 2 form but with a covering sheet 12' which extends exteriorly to completely cover the core channel 10, with the retainers 20 enclosed within the covering sheet 12'. In this embodiment, the portion of sheet 12' which extends exteriorly over the bottom wall of core channel 10 is cemented thereto and obviates the need for the strip 24 of the Figs. 1 and 2 form. The operation of the Fig. 4 form is the same as the Figs. 1 and 2 form with the covered retainers 20 engaging back of the in-turned edges 26 of the mounting channel 28 for locking the glass run channel similar to the locking in the Figs. 1 and 2 form.

Figs. 5–7 illustrate the invention as it may be embodied in a glass run channel having a metal core channel of a type as disclosed and claimed in my United States Patent No. 1,903,541, granted April 11, 1933. The bottom wall 30, of this channel is plane and the side walls are deeply notched to provide spaced side arms 32 which can move relatively as the glass run channel is being bent to conform to window frame curvatures.

Referring to Fig. 7, the retainers 20, which may be the same as shown in Fig. 3, are assembled on the core channel with the transverse portions 22 crossing at the inner side of the bottom wall 30 and with the legs 20' extending out through the spaces between side arms 32. A fabric sheet 34 covers the interior of the core channel, similar to the covering sheet 12 of the Figs. 1 and 2 form but with the portion of the sheet 34 which covers bottom wall 30 laid over the transverse portions 22 to maintain the retainers 20 in operative association with the channel. However, the retainers 20 may be welded to the bottom wall of the channel if desired. As in the previously described form, the covering sheet 34 is cemented to the metal core channel and has the substantial marginal portions 35 turned outwardly over the ends of the arms 32 and cemented exteriorly to the free end portions of the arms, the ends of alternate arms being offset a little in opposite directions to provide shoulders, which are covered by the fabric 34, 35, for supporting a usual metal bead strip 36 at each edge of the channel, the bead strips maintaining the ends of arms 32 in general alignment with ability to adjust themselves relatively within the bead strips when the channel is bent to conform to any particular window frame curvature. In this Figs. 5–7 embodiment, thick strips 38, of felt or the like, are stitched to the covering sheet 34 within the channel, and constitute the cushioning elements which directly engage the window glass.

The locking action of the retainers 20 in the Figs. 5–7 form is similar to that of the earlier described forms, as will be apparent from the showing of Fig. 5.

My improved glass run channels with resilient locking retainers may be quickly and effectively mounted in a conventional supporting structure without the customary clips and comparable separate fastening elements. However, it should be understood that the particular mounting channel 28 with in-turned edges 26 is but illustrative of mounting supports in general wherein shoulders or abutments comparable to the edges 26 are available and behind which the retainers 20 may engage to securely lock a glass run channel to its support.

It is intended that the patent shall cover, by suitable expression in the appended claims, whatever features of patentable novelty exist in the invention disclosed.

I claim as my invention:

1. A glass run channel comprising a sheet metal core channel having a bottom wall and substantially parallel side walls disposed substantially at right angles to said bottom wall, a sheet of flexible material secured interiorly of the core channel in covering relation to the bottom and side walls of the core channel, cushioning material secured to said covering sheet and extending along the bottom and each side wall of the core channel interiorly thereof for directly contacting the glass of a window engaged in the core channel, and resilient core channel-retainer means distributed at intervals along each side of the core channel exteriorly thereof, said retainer means being secured to the core channel only at said bottom wall of the core channel and having resilient portions projecting obliquely outward relative to said side walls of the core channel at spaced locations therealong, each said obliquely projecting portion of the retainer means terminating at a location substantially outward of the adjacent side wall of the core channel and being resiliently yieldable toward said adjacent side wall, whereby the terminals of said resilient portions of the retainer means constitute abutments outward of the side walls of the core channel for locking coaction with abutments on a support for the core channel.

2. A glass run channel comprising a sheet metal core channel having a bottom wall and substantially parallel side walls disposed substantially at right angles to said bottom wall, a sheet of flexible material secured interiorly of the core channel in covering relation to the bottom and side walls of the core channel, cushioning material secured to said covering sheet and extending along the bottom and each side wall of the core channel interiorly thereof for directly contacting the glass of a window engaged in the core channel, and resilient core channel-retainer means distributed at intervals along each side of the core channel exteriorly thereof, said retainer means being secured to the core channel only at said bottom wall of the core channel and having resilient portions projecting obliquely outward relative to said side walls of the core channel at spaced locations therealong and in staggered relation at opposite sides of the core channel, each said obliquely projecting portion of the retainer means terminating at a location substantially outward of the adjacent side wall of the core channel and being resiliently yieldable toward said adjacent side wall, whereby the terminals of said resilient portions of the retainer means constitute abutments outward of the side walls of the core channel for locking coaction with abutments on a support for the core channel.

3. A glass run channel comprising a sheet metal core channel, a sheet of flexible material secured interiorly of the core channel in covering relation to the bottom and side walls of the core channel, cushioning material secured to said covering sheet and extending along the bottom and each side wall of the core channel interiorly thereof for directly contacting the glass of a window engaged in the core channel, and resilient core channel-retainer means distributed at intervals along each side of the core channel exteriorly thereof, said retainer means comprising a bent wire of resilient material having portions extending back and forth transversely of the core channel at the bottom of the core channel and generally inverted U-shaped portions between the transverse portions and projecting in oblique relation to the sides of the core channel at intervals along each side wall of the core channel, whereby said generally U-shaped portions are resiliently yieldable toward the said side walls, and means securing said transverse portions of the bent wire to the bottom wall of the core channel.

4. A glass run channel comprising a sheet metal core channel having its bottom and side walls corrugated transversely of the core channel to facilitate shaping of the core channel to accommodate window frame curvatures, flexible sheet material cemented to the core channel in covering relation to the interior surfaces of the walls of the core channel and turned outwardly over the side edges of the core channel in exterior covering relation to at least a substantial marginal region along each side edge of the core channel, cushioning material secured to the said flexible sheet material and extending along the bottom and side walls of the core channel interiorly thereof, and retainer means of bent resilient wire having transverse portions seated in exterior grooves of the corrugated bottom wall of the core channel, and having a portion integral with each said transverse portion extending obliquely outward in the plane of a said corrugation, each said obliquely extending portion of the wire being resiliently yieldable toward a side wall of the core channel, and means securing said transverse portions of the bent wire to the bottom of the core channel.

5. A glass run channel comprising a sheet metal core channel having its side walls deeply notched to provide spaced arms along each side of the core channel, a bent wire of resilient material having portions extending through spaces between said arms and transversely across the core channel at the inner side of the bottom wall of the core channel, said wire having at least one integral extension of a said transverse portion projecting obliquely at each side of the core channel and resiliently yieldable toward the adjacent side wall of the core channel, a sheet of flexible material cemented to the core channel in covering relation to the interior surfaces of the bottom and sides of the core channel and arranged over said transverse portions of the wire, securing them to the bottom wall of the core channel, and cushioning means secured to said flexible sheet and extending along the bottom and sides of the core channel interiorly thereof.

DAVID C. BAILEY.

REFERENCES CITED

The following references are of record in the file of this patent:

UNITED STATES PATENTS

| Number | Name | Date |
| --- | --- | --- |
| 1,927,651 | Reid | Sept. 19, 1933 |
| 2,132,104 | Froeliger | Oct. 4, 1938 |